(12) United States Patent
Baron (10) Patent No.: US 10,052,925 B2
(45) Date of Patent: Aug. 21, 2018

(54) HITCH BALL COVER POST (71) Applicant: Peter Baron, Huntington Beach, CA (US)

(72) Inventor: Peter Baron, Huntington Beach, CA (US)

( * ) Notice: Subject to any disclaimer, the term of this patent is extended or adjusted under 35 U.S.C. 154(b) by 132 days.

(21) Appl. No.: 15/221,410

(22) Filed: Jul. 27, 2016

(65) Prior Publication Data
US 2017/0057312 A1    Mar. 2, 2017

Related U.S. Application Data (60) Provisional application No. 62/209,743, filed on Aug. 25, 2015.

(51) Int. Cl.
*B60D 1/60* (2006.01)
*B60D 1/06* (2006.01)
*B60R 13/00* (2006.01)

(52) U.S. Cl.
CPC ............. *B60D 1/605* (2013.01); *B60D 1/06* (2013.01); *B60R 13/00* (2013.01)

(58) Field of Classification Search
CPC ........... B60D 1/06; B60D 1/605; B60R 13/00
USPC ........................................................ 280/507
See application file for complete search history.

(56) References Cited

U.S. PATENT DOCUMENTS

| | | | | | |
|---|---|---|---|---|---|
| 2,512,222 | A | * | 6/1950 | Brock | B60D 1/60 280/507 |
| 3,841,664 | A | * | 10/1974 | Anderson | B60D 1/60 280/507 |
| 5,219,435 | A | * | 6/1993 | Sprunger | B60D 1/07 280/507 |
| 5,681,053 | A | * | 10/1997 | Misukanis | B60D 1/60 280/507 |
| 6,637,765 | B2 | * | 10/2003 | Barton | B60D 1/065 280/432 |
| 2009/0322061 | A1 | * | 12/2009 | Rodriguez | B60D 1/60 280/507 |

OTHER PUBLICATIONS

"Hitch Critters," retrieved online Aug. 12, 2015; http://www.ultimate-truck.com/Hitch_Critters.html.

* cited by examiner

*Primary Examiner* — Kevin Hurley
*Assistant Examiner* — Felicia L. Brittman
(74) *Attorney, Agent, or Firm* — Cionca IP Law P.C.; Marin Cionca (57) ABSTRACT A cover set for a vehicle hitch ball configured to be secured to and protect the vehicle ball, the cover set having a first and a second U-bolt; a cover having a left face, a right face, a top face, a front face, an open bottom, and a back face having a center hole configured to allow at least a portion of at least a standard vehicle hitch ball to fit within the center hole, a pair of upper back face holes proximate to the top face, a pair of lower back face holes proximate to the open bottom, each hole of the pair of lower back face holes being configured to allow passage of a bolt for securing the U-bolt around a vehicle hitch ball neck portion, and a back face cutout along a bottom edge of the back face for conforming to a vehicle hitch ball mount.

18 Claims, 6 Drawing Sheets

HITCH BALL COVER POST

CROSS-REFERENCE TO RELATED APPLICATIONS

This application claims the benefit of U.S. Provisional Application No. 62/209,743, filed Aug. 25, 2015, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to vehicle hitch covers and more specifically to secure, protective, and decorative vehicle hitch covers.

2. Description of the Related Art

Vehicles capable of towing may have permanent or removable towing equipment, such as a ball mount and hitch ball. When not in use, some drivers may find the equipment unsightly, or may also wish to protect the equipment from rust, dirt, or other damage. Some vehicles may have a permanent or non-adjustable ball mount, or some drivers may use their hitch ball and ball mount frequently enough that they may not wish to remove it for storage. A ball cover may therefore be used to cover the hitch ball.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect a hitch ball cover post is provided wherein a bolt curved into a U-shape (hereinafter "U-bolt") is secured around the neck of a hitch ball through a post (hereinafter "hitch ball cover post," "hitch ball secured post," "hitch ball cover," or "post"), and a design may be mounted onto the post. Thus, an advantage is that the post provides protection from the elements to the hitch ball, and the mounted design may provide aesthetic value to the vehicle. Another advantage is that securing the U-bolt, hitch ball, and hitch ball cover post together may prevent or deter theft of the ornament, hitch ball, or any other part of the towing equipment.

In another aspect a single type of U-bolt may be used to attach a single hitch ball cover post to several different sizes of hitch balls. Thus, an advantage is that convenience is provided to the user, as the same protective cover and ornament may be used even when different sizes of hitch balls may be needed for their vehicle.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 201 and 301, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 2A:
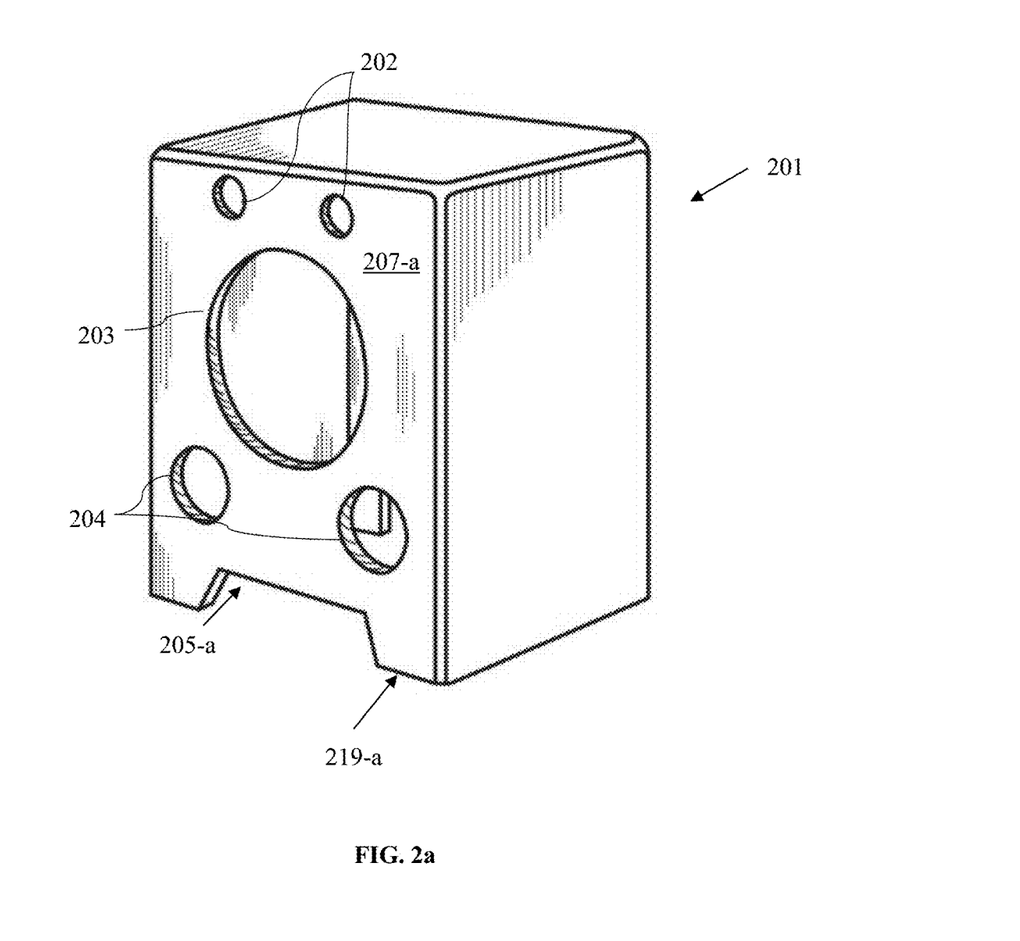
FIG. 2a illustrates a back perspective view of a hitch ball cover post, according to an aspect.

FIG. 2*a* illustrates a back perspective view of a hitch ball cover post (hereinafter "hitch ball cover post," "cover post," or "post") 201, according to an aspect. The hitch ball cover post 201 may be part of a cover set, which may include a U-bolt (shown as 410-*a* and 410-*b* in FIGS. 4*a*-4*b*) to cover and protect a vehicle hitch ball. The hitch ball cover post 201 may be a rectangular or square shaped tube, such as a cuboid or cube, or any other suitable shape. The hitch ball cover post 201 may be five-sided, having five faces, and be open on a bottom end 219-*a*, to enable the cover post 201 to be placed around a hitch ball. The hitch ball cover post 201 may be constructed of stainless steel, or any other suitable durable material able to protect the hitch ball 100. The back face 207-*a* (hereinafter "back face," "back wall," or "back") of the hitch ball cover post 201 may include two upper holes 202, a center hole 203 for accommodating a hitch ball 100, and two lower installation holes 204 ("lower installation holes" or "lower U-bolt installation holes") for installation of a U-bolt (shown in FIG. 6*a*). The back face 207-*a* of the hitch ball cover post 201 may include a back cutout 205-*a* to accommodate a bar, or any other mount that a ball may be attached or mounted to (not shown), or any other such similar towing equipment. The back cutout 205-*a* may be of any suitable shape for accommodating towing equipment or any other equipment that the hitch ball 100 may be attached to. As an example, the back cutout 205-*a* may be wedge-shaped.

Figure 2B:
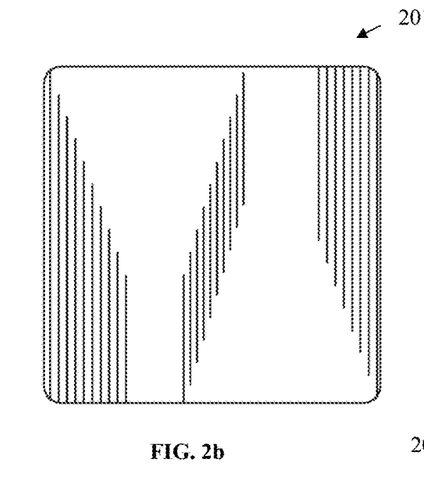
FIGS. 2b-2c illustrate a top and bottom view, respectively, of a hitch ball cover post, according to an aspect.
Figure 2C:
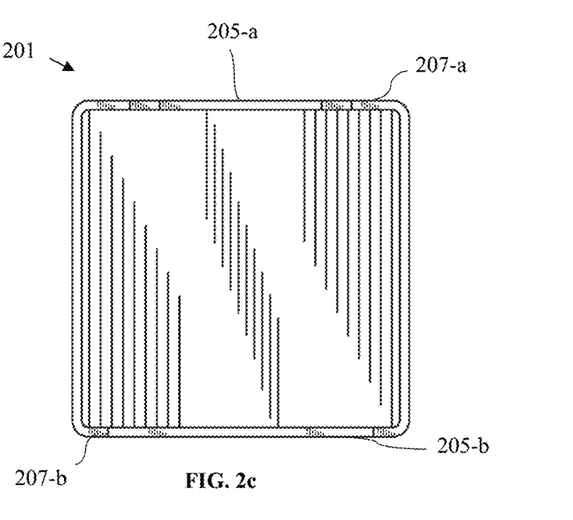

FIGS. 2*b*-2*c* illustrate a top and bottom view, respectively, of a hitch ball cover post 201, according to an aspect. A back cutout 205-*a* may be included along the bottom edge of the back face 207-*a*. Another front cutout 205-*b* may be included along the bottom edge of the front face 207-*b* (hereinafter "front" or "front face"), opposite to the back cutout 205-*a*. The front cutout 205-*b* may be larger than the back cutout 205-*a*, and may be used for accommodating a U-bolt (shown as 410-*a* and 410-*b* in FIGS. 4*a*-4*b*) and may help the user install the cover post 201 by providing easy access to the inside of the cover post 201.

Figure 2D:
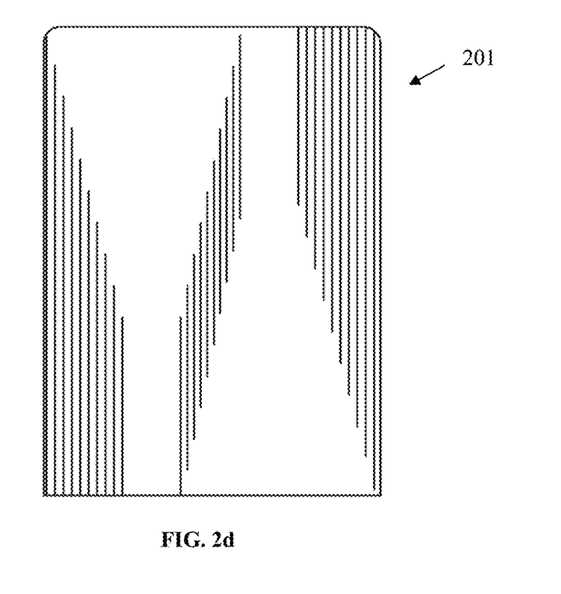
FIG. 2d illustrates a side view of a hitch ball cover post, the left and right sides being similar, according to an aspect.

FIG. 2*d* illustrates a side view of a hitch ball cover post 201, the left and right sides being similar, according to an aspect. The left and right faces of the hitch ball cover post may be absent of any cutouts.

Figure 1A:
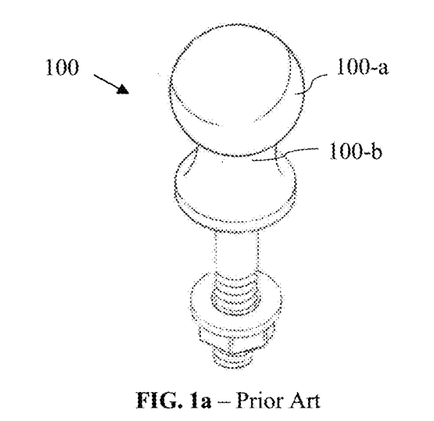
FIG. 1a illustrates an exemplary hitch ball as known in the prior art.
Figure 1B:
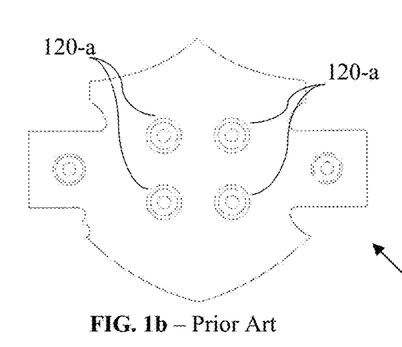
FIG. 1b-d illustrate a back, front, and side view, respectively, of an exemplary decorative element, as known in the prior art.
Figure 1C:
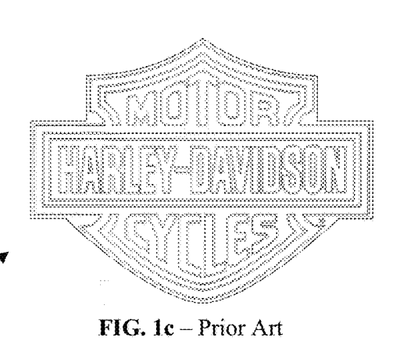
Figure 1D:
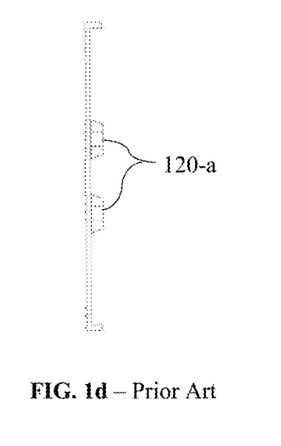
Figure 3A:
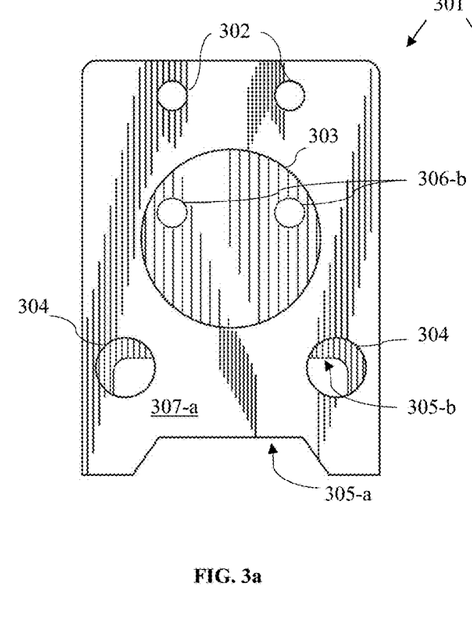
FIGS. 3a-3b illustrate a back view and front view, respectively, of a hitch ball cover post, according to an aspect.
Figure 3B:
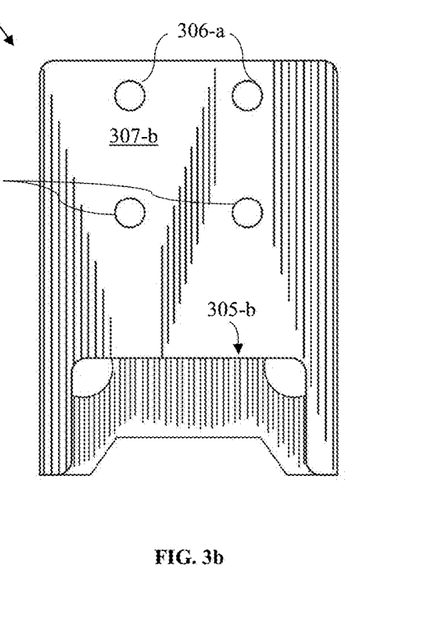

FIGS. 3*a*-3*b* illustrate a back view and front view, respectively, of a hitch ball cover post 301, according to an aspect. The front face 307-*b* of the hitch ball cover post 301 may include a front cutout 305-*b*, which may be rectangular in shape, for example, or any other suitable shape, and may be larger than the cutout 307-*a* on the back face 307-*a*. Again, the front cutout 305-*b* may be shaped such that the cover post 301 fits around a U-bolt (shown as 410-*a* and 410-*b* in FIGS. 4*a*-4*b*), and may also provide the user access to reach inside of the cover post 301 to hold the U-bolt during installation of the cover post 301 to a vehicle hitch ball. The front face 307-*b* may also include four decorative element installation holes (hereinafter "decorative element installation holes" or "installation holes"), which may be arranged as shown with two upper installation holes 306-*a* and two lower installation holes 306-*b*. The decorative element installation holes 306-*a* and 306-*b* may be used to attach a design, an emblem, a logo, or any other ornamental piece or decorative element (as shown in FIGS. 1*b*-*d*) to the hitch ball cover post 301, by screws or any other suitable method. The upper holes 302 of the back face 307-*a* may align with the upper decorative element installation holes 306-*a* of the front face 307-*b*, such that a screwdriver or other similar tool (not shown) inserted into the upper holes 302 on the back face 307-*a* may reach the upper decorative element installation holes 306-*a* on the front face 307-*b*. A screwdriver therefore may be used to secure a decorative element 120 to the front wall 307-*b*. The back face 307-*a* may also include a pair of lower U-bolt installation holes 304, which may be in larger in size than the upper holes 302.

As an example, the hitch ball cover post 301 may be 88.5 millimeters (mm) high, and 63.5 mm wide and long. The decorative element installation holes 306-*a* and 306-*b* may be 6.31 mm in diameter. The upper holes 202 may be 6.31 mm in diameter. The center hole 303 may be 38 mm in diameter. Again, as an example, the interior square wall of the hitch ball cover post 301 may be approximately 59.2 mm by 59 mm. The four decorative element installation holes 306-*a* and 306-*b* may, for example, be arranged in a square or rectangular shape, and each hole may be 25 mm apart from each adjacent hole, from center-to-center of the holes. A square arrangement of the installation holes 306-*a* and 306-*b* may be placed in the hitch ball cover post 301 such that currently available decorative elements may be securely installed using them, such as, for example, by screws. The installation holes 306-*a* and 306-*b* may also be arranged in any other suitable configuration such that any other suitable decorative element may be installed using them.

Figure 4A:
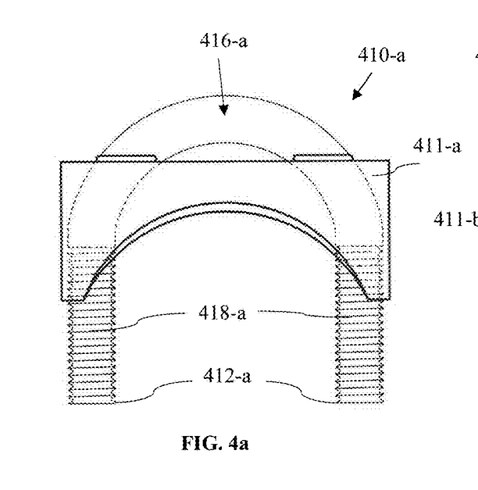
FIGS. 4a-4b illustrate side views of a long U-bolt according to an aspect, and a short U-bolt, respectively, according to an aspect.
Figure 4B:
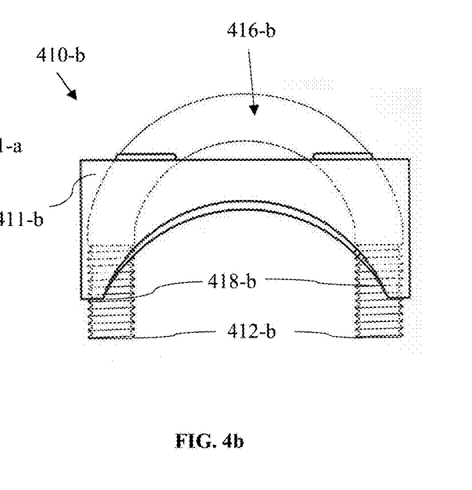

FIGS. 4*a*-4*b* illustrate side views of a long U-bolt 410-*a* (hereinafter "long U-bolt or HCB," which may be used with standard North American hitch balls) according to an embodiment, and a short U-bolt 410-*b* (hereinafter "short U-bolt" or "HCBE," which may be used with European hitch balls), according to an aspect, respectively.

Figure 4C:
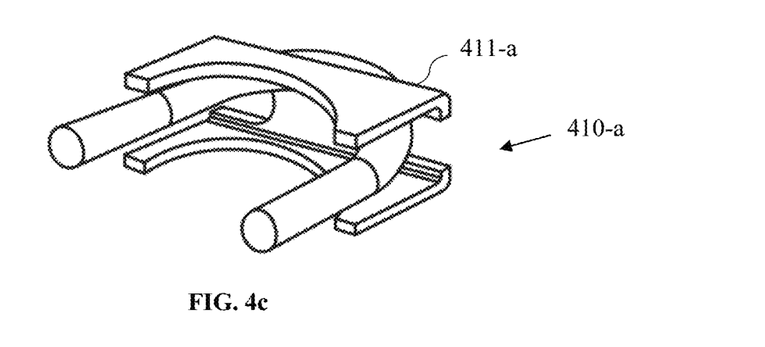
FIG. 4c illustrates a perspective view of a long U-bolt, according to an aspect.

FIG. 4*c* illustrates a perspective view of a long U-bolt 410-*a*, according to an aspect. The U-bolts 410-*a* or 410-*b* may be curved in the shape of a U and may have two ends 412-*a* or 412-*b*. As an example, the long U-bolt 410-*a* may have a length of 27 millimeters (mm) from the base of the U-bolt's curve 416-*a* to the ends 412-*a*, and the short U-bolt 410-*a* may have a length of 15 mm from the base of the U-bolt's curve 416-*b* to the end 412-*b*. The ends 412-*a* or 412-*b* of each U-bolt 410-*a* or 410-*b* may include threads 418-*a* or 418-*b* such that a bolt or other any other suitable means for securing the U-bolt 410-*a* or 410-*b* may be attached. The U-bolts 410-*a* or 410-*b* may be associated with a sleeve 411-*a* or 411-*b*, which may be welded to the top and bottom of the U-bolts 410-*a* or 410-*b*. The sleeve 411-*a* or 411-*b* may, for example, be of the same dimensions when used with either the long U-bolt 410-*a* or the short U-bolt 410-*b*. The sleeve 411-*a* or 411-*b* may add support and stability, restricting the movement of the U-bolt and thus restricting the movement of the hitch ball cover post, such that the hitch ball cover post 201 stays securely in place around the hitch ball 100. As an example, a single long U-bolt 410-*a* may be used to secure a hitch ball post cover 201 to any one of the three hitch ball sizes popular in North America, such as, for example, a 1⅞ inch, 2 inch, or 2 5/16 inch size hitch ball, and the single U-bolt may be called HCB. As another example, a short U-bolt 410-*b* may be used to secure a hitch ball post cover 201 to other popular hitch ball sizes, such as, for example, those used in Europe, and the single U-bolt may be called HCBE.

Figure 5A:
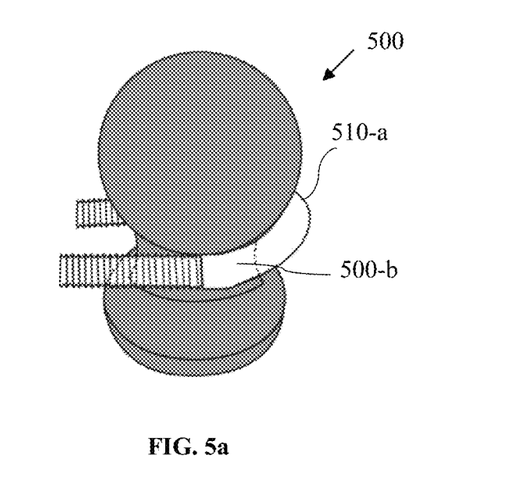
FIGS. 5a-5b illustrate side views of an exemplary long U-bolt wrapped around an exemplary hitch ball, and an exemplary short U-bolt wrapped around an exemplary European hitch ball, respectively, according to an aspect.
Figure 5B:
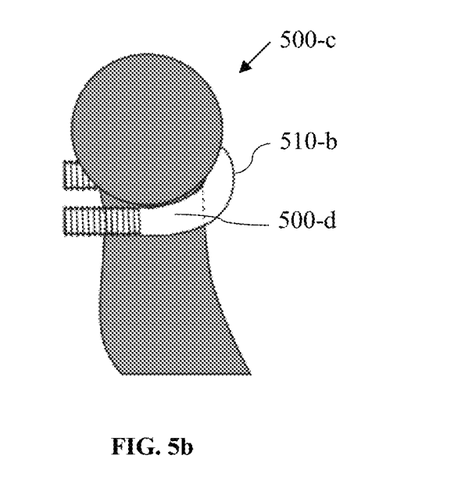

FIGS. 5a-5b illustrate side views of an exemplary long U-bolt 510-a wrapped around the neck 500-b of an exemplary North American hitch ball 500, and an exemplary short U-bolt 510-b wrapped around the neck 500-d of an exemplary European hitch ball 500-c, respectively, according to an aspect. The European hitch ball 500-c may, for example, have a narrower neck 500-d than that of the North American hitch ball 500. The U-bolts 510-a and 510-b are shown without a sleeve 411-a or 411-b for clarity. The U-bolt 510-a or 510-b may, for example, be wrapped around the neck 500-b of a hitch ball 500 as shown to begin the installation of the hitch ball cover post 201.

Figure 6A:
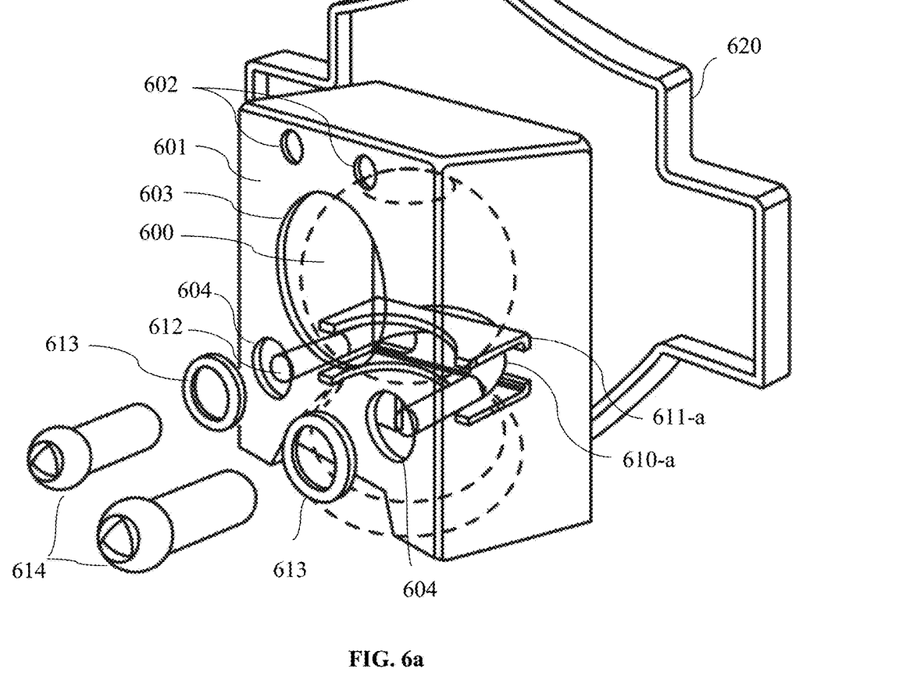
FIG. 6a illustrates a back perspective view of an exemplary hitch ball cover post in use on a hitch ball, with a decorative element attached to the front of the post, and an exploded perspective view of an exemplary means for securing the post around the hitch ball, according to an aspect.

FIG. 6a illustrates a back perspective view of an exemplary hitch ball cover post 601 in use on a hitch ball 600, with a decorative element 620 attached to the front of the post 601, and an exploded perspective view of an exemplary means for securing the post 601 around the hitch ball 600, according to an aspect. The decorative element 620 may be secured to the post 601 by screws tightened (not shown) into holes 120-a in the decorative element 620 (as shown in FIG. 1b), or any other suitable means. To install the decorative element 620 from the back side of the hitch ball cover post 601, a screwdriver may be inserted into the upper holes 602 to reach the upper installation holes 306-a (shown in FIG. 3b), and may be inserted into the center hole 603 to reach the lower installation holes 306-b (shown in FIG. 3b). A U-bolt 610-a may be wrapped around the hitch ball 600. A U-bolt sleeve 611-a may conform to the shape of the hitch ball 600 as shown in FIG. 6a, and thus may be used to stabilize the U-bolt 610-a around the hitch ball 600. The U-bolt 610-a may be secured around the hitch ball 600 and post 601 by inserting each U-bolt end 612 through the lower holes 604 of the post 601, and then may be secured by any suitable means known in the art, such as, for example, using washers 613 and bolts 614. The front cutout 305-b on the front wall of the post 601, as shown in FIG. 3b, may aid the user during installation, such that the user may reach into the post 601 and hold the U-bolt 610-a. The user may also reach in through the front cutout 305-b push the U-bolt 610-a towards the lower holes 604 as washers 613 and bolts 614 are being tightened. In another embodiment, any other suitable means of securing the post 601 and U-bolt 610-a or 410-b may be used.

Figure 6B:
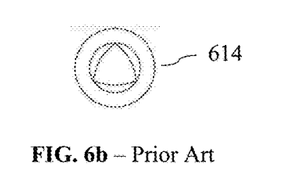
FIGS. 6b-6c illustrate a top view and a side view, respectively, of an example of a tamper-resistant bolt having a triangular hole, as known in the prior art.
Figure 6C:
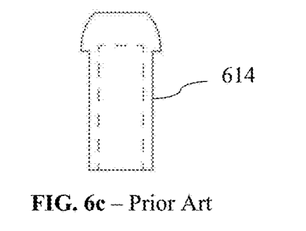

FIGS. 6b-6c illustrate a top view and a side view, respectively, of an example of a tamper-resistant bolt 614 having a triangular hole, as known in the prior art.

Figure 6D:
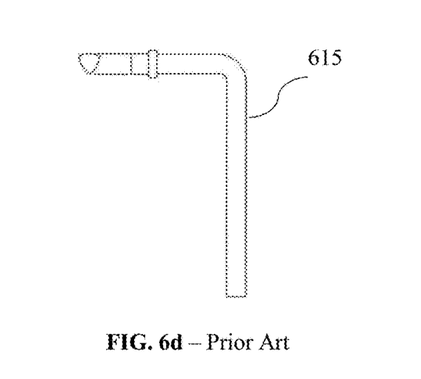
FIG. 6d illustrates a side view of a screwdriver specially designed to work with the tamper-resistant bolt of FIGS. 6b-c, as known in the prior art.

FIG. 6d illustrates a side view of a screwdriver 615 specially designed to work with the tamper-resistant bolt 614 of FIGS. 6b-c, as known in the prior art. Tamper-resistant bolts 614 may be used to secure a U-bolt 610-a or 410-b, hitch ball cover post 601, and hitch ball 600 together. An advantage is that theft or accidental loss of the hitch ball cover post may be decreased due to the tamper-resistant bolts. As an alternative embodiment, any other suitable type of bolts of means of securing the U-bolt 610-a or 410-b may be used, such as, for example, standard screws.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A cover set for a vehicle hitch ball configured to be secured to and protect the vehicle hitch ball, the cover set comprising a cover having a hollow cuboid shape, and a pair of U-bolts comprising a first U-bolt having a first length and a second U-bolt having a second length longer than the first length, each of the first and second U-bolts being configured to conform to a standard vehicle hitch ball; the cover having a left face, a right face, a top face, a back face, a front face, and an open bottom; the back face having a center hole configured to allow at least a portion of at least a standard vehicle hitch ball to fit within the center hole, a pair of upper back face holes proximate to the top face, a pair of lower back face holes proximate to the open bottom, each lower back face hole of the pair of lower back face holes being configured to allow passage of a first bolt for securing at least a U-bolt of the pair of U-bolts around a neck portion of the vehicle hitch ball, and a back face cutout along a bottom edge of the back face for conforming to a vehicle hitch ball mount.

2. The cover set of claim 1, wherein the cover is configured to display a first decorative element, the first decorative element being secured to the cover through a plurality of installation holes such that the user can remove the decorative element and replace the decorative element with a second decorative element configured to align with a plurality of installation holes on the front face.

3. The cover set of claim 1, wherein the cover is constructed from stainless steel.

4. The cover of claim 1, wherein the first bolt used to secure the cover to the vehicle hitch ball is tamper-resistant.

5. The cover set of claim 1, wherein the back face cutout is wedge-shaped.

6. The cover set of claim 1, further comprising a front face cutout, along the bottom edge of the front face, which is rectangular in shape, for allowing the at least a U-bolt of the pair of U-bolts to be positioned around the neck of the vehicle hitch ball.

7. The cover set of claim 1, wherein the first and second U-bolts are each associated with a sleeve having a first rounded edge on a first side of the first and second U-bolts, and a second rounded edge on a second side of the first and second U-bolts, wherein the first rounded edge and the second rounded edge curve around the vehicle hitch ball, such that when the first or the second U-bolt is secured around the neck portion of the vehicle hitch ball, the first or the second U-bolt and the cover are restricted from movement.

8. A cover set for a vehicle hitch ball configured to be secured to and protect the vehicle hitch ball and also display a decorative element, the cover set comprising a cover having a hollow cuboid shape, and a first U-bolt having a first length conforming to a first standard vehicle hitch ball; the cover having a left face, a right face, a top face, a back face, a front face, and an open bottom; the back face having a center hole configured to allow at least a portion of a standard vehicle hitch ball to fit within the center hole, a pair of upper back face holes proximate to the top face, a pair of lower back face holes proximate to the open bottom, each lower back face hole of the pair of lower back face holes being configured to allow passage of a first bolt for securing the first U-bolt around a neck portion of the vehicle hitch ball, and a back face cutout along a bottom edge of the back face for conforming to a vehicle hitch ball mount; wherein the front face has a plurality of front face holes, wherein at least one front face hole of the plurality of front face holes is opposite to one hole of the pair of upper back face holes, such that the at least one front face hole can be accessed from the back of the cover via the one hole of the pair of upper back face holes to secure the decorative element to the front face via a second bolt passing through the at least one front face hole and coupled with the decorative element.

9. The cover set of claim 8 further comprising a second U-bolt having a second length longer than the first length conforming to a second standard vehicle hitch ball.

10. The cover set of claim 8, wherein the cover is constructed from stainless steel.

11. The cover set of claim 8, wherein the first bolt used to secure the cover to the vehicle hitch ball is tamper-resistant.

12. The cover set of claim 8, wherein the back face cutout is wedge-shaped.

13. The cover set of claim 8, further comprising a front face cutout, along the bottom edge of the front face, which is rectangular in shape, for allowing the U-bolt to be positioned around the neck of the vehicle hitch ball.

14. The cover set of claim 8, wherein the first and second U-bolts are each associated with a sleeve having a first rounded edge on a first side of the first and second U-bolt, and a second rounded edge on a second side of the first and second U-bolt, wherein the first rounded edge and the second rounded edge curve around the vehicle hitch ball, such that when the first or the second U-bolt is secured around the neck portion of the vehicle hitch ball, the first or the second U-bolt and the cover are restricted from movement.

15. The cover set of claim 8, wherein the plurality of front face holes comprises four holes.

16. A method of protecting and decorating a vehicle hitch ball, comprising the steps of:
wrapping a U-bolt around a neck portion of the vehicle hitch ball;
securing a decorative element to a cover, the cover having a cuboid shape comprising a left face, a right face, a top face, a back face, a front face, and an open bottom end;
placing the open bottom end of the cover around the vehicle hitch ball such that the cover encloses at least a first portion of the vehicle hitch ball and encloses the U-bolt, wherein at least a second portion of the vehicle hitch ball fits into a center hole in the back face of the cover and the U-bolt being enclosed inside of the cover;
inserting a first screw into the back face of the cover through a first hole of a pair of lower installation holes;
screwing the first screw into a first end of the U-bolt from the back face;
inserting a second screw into the back face of the cover through a second hole of a pair of lower installation holes; and
screwing the second screw into a second end of the U-bolt from the back face.

17. The method of claim 16, wherein the first screw and the second screw secured to the first end and the second end of the U-bolt are tamper-resistant.

18. The method of claim 16, wherein the cover is constructed from stainless steel.

* * * * *